United States Patent [19]
Ziemer

[11] Patent Number: 6,030,921
[45] Date of Patent: Feb. 29, 2000

[54] SULFUR RESISTANT HYDROCONVERSION CATALYST AND HYDROPROCESS OF SULFUR-CONTAINING LUBE FEEDSTOCK

[75] Inventor: James N. Ziemer, Martinez, Calif.

[73] Assignee: Chevron U.S.A. Inc., San Francisco, Calif.

[21] Appl. No.: 08/883,633

[22] Filed: Jun. 26, 1997

Related U.S. Application Data

[60] Provisional application No. 60/021,776, Jul. 15, 1996.

[51] Int. Cl.[7] .............................. B01J 23/00; B01J 23/56; C22C 5/00; C10G 35/06
[52] U.S. Cl. .......................... 502/325; 502/327; 502/332; 502/333; 502/334; 502/339; 502/355; 502/415; 148/430; 420/465; 420/466; 420/580; 208/124; 208/137; 208/244
[58] Field of Search ..................................... 502/327, 332, 502/333, 334, 339, 355, 415, 325; 148/430; 420/465, 466, 580; 208/124, 137, 244

[56] References Cited

U.S. PATENT DOCUMENTS

| | | | |
|---|---|---|---|
| 2,818,393 | 12/1957 | Lefrancois et al. | 502/333 |
| 3,340,181 | 9/1967 | Diringer et al. | 208/210 |
| 3,637,484 | 1/1972 | Hansford | 208/143 |
| 3,637,878 | 1/1972 | Hansford | 260/667 |
| 3,673,078 | 6/1972 | Kirk | 208/89 |
| 3,759,823 | 9/1973 | Davies et al. | 208/138 |
| 3,852,207 | 12/1974 | Stangeland et al. | 208/58 |
| 3,943,053 | 3/1976 | Kovach et al. | 208/143 |
| 3,944,504 | 3/1976 | Ford et al. | 502/327 |
| 3,962,071 | 6/1976 | Itoh et al. | 208/58 |
| 3,979,279 | 9/1976 | Yan | 208/264 |
| 4,347,121 | 8/1982 | Mayer et al. | 208/58 |
| 5,346,874 | 9/1994 | Clark et al. | 502/207 |
| 5,393,408 | 2/1995 | Ziemer et al. | 208/57 |
| 5,453,176 | 9/1995 | Narloch et al. | 208/58 |
| 5,763,351 | 6/1998 | Ichimura | 502/303 |

FOREIGN PATENT DOCUMENTS

| | | | |
|---|---|---|---|
| 0 018 808 | 11/1980 | European Pat. Off. | C10G 35/09 |
| 1 476 428 | 6/1977 | United Kingdom | C10G 34/00 |
| 2 104 406 | 3/1983 | United Kingdom | B01J 29/38 |
| WO 98/18883 | 10/1997 | WIPO | C10G 73/02 |

OTHER PUBLICATIONS

Chiou et al.; "Aromatics Reduction over Supported Platinum Catalysts. 1. Effect of Sulfur on the Catalyst Deactivation of Tetralin Hydrogenation", *Ind. Eng. Chem. Res.*, vol. 34, No. 12; pp. 4277–4283. Oct. 1995.

Lin et al.; "Aromatics Reduction over Supported Platinum Catalysts. 2. Improvement in Sulfur Resistance by Addition of Palladium to Supported Platinum Catalysts", *Ind. Eng. Chem. Res.*, vol. 34, No. 12; pp. 4284–4289. Oct. 1995.

*Primary Examiner*—Mark L. Bell
*Assistant Examiner*—Patricia L. Hailey
*Attorney, Agent, or Firm*—A. Stephen Zavell; W. Keith Turner; Alan W. Klaassen

[57] ABSTRACT

The present invention relates to a novel platinum palladium alloy catalyst useful in hydrofinishing and hydrocracking non low sulfur content feedstock and the process of hydrofinishing and hydrocracking such non low sulfur content feedstock feeds. The catalyst maintains the activity of a palladium catalyst with the sulfur tolerance of a platinum catalyst without the need for the higher reaction temperatures normally associated with platinum based catalysts and thus avoid the higher rates of undesirable cracking reactions in the fabrication of a lubricating base oil stock.

14 Claims, No Drawings

SULFUR RESISTANT HYDROCONVERSION CATALYST AND HYDROPROCESS OF SULFUR-CONTAINING LUBE FEEDSTOCK

CROSS-REFERENCE TO RELATED APPLICATIONS

This application claims priority from and the benefit of U.S. Provisional Application Ser. No. 60/021,776, filed Jul. 15, 1996. This application is also related to an application with the same inventor and title filed on the same day as this application, assigned U.S. Ser. No. 08/883,006, filed Jun. 26, 1997, the specification of which is incorporated herein by reference for all purposes.

FIELD OF THE INVENTION

The present invention relates to petroleum processing catalysts. More specifically, the present invention relates to sulfur resistant hydroconversion catalysts useful in hydrofinishing and/or hydrocracking processes for lube oil basestock.

Modern refining processes for producing lubricating oils from crudes typically use a number of hydrogen processes. These processes are employed to produce lubricating oils having suitable lubricating properties over a wide range of operating temperatures. Hydrocracking is an upgrading process for increasing viscosity index by removing low viscosity index molecules, including molecules containing sulfur and nitrogen. Non-hydrogenation processes, such as solvent extraction, are also commonly used for upgrading a lubricating oil feedstock. Hydrotreating, particularly mild hydrotreating known as hydrofinishing, may be used to stabilize the oil against oxidation by saturation of the aromatics and olefins, removal of sulfur and nitrogen, and destruction of color bodies in the oil. Catalytic dewaxing may be used to remove wax, thereby improving the appearance and the low temperature properties of the lubricating oil.

The order of processes for preparing the lubricating oils depends somewhat on the specific requirements of the overall process. However, in general, the upgrading steps to increase VI and remove sulfur and nitrogen from the oil precedes the hydrotreating and dewaxing steps. In many cases, it is desirable that a hydrotreating step follow the upgrading and dewaxing steps to remove unstable molecules which may have passed unconverted through the other processing steps, or which may have been generated in the other processing steps. The catalyst used in the final hydrotreating step often contains a hydrogenation component selected from the platinum group metals. Both platinum and palladium have been taught as being suitably hydrogenation components for this application.

However, continual development of lubricating oil processes has generated new requirements for the lube hydrotreating catalysts. For example, the sulfur content of the feeds to the hydrotreating catalyst may be sufficiently high that the conventional hydrotreating catalysts are no longer suitable for that purpose. A palladium containing catalyst is often selected for lube hydrotreating on account of its high activity, but palladium requires low sulfur feedstocks, i.e., a sulfur content of less than about 100 ppm, preferably less than about 25 ppm. Platinum (Pt) is more sulfur tolerant than palladium, but is less active. The lower activity requires higher reaction temperatures, which leads to higher rates of undesirable cracking reactions and lower product oil stability. A hydrotreating catalyst having both high activity and high stability in the presence of significant amounts of sulfur is desired.

SUMMARY OF THE INVENTION

The present invention circumscribes a catalyst and a process which meets the previously desirable criteria as well as many additional benefits obvious to the ordinary skilled artisan. Accordingly, the invention is directed to a catalyst exhibiting improved sulfur tolerance comprising a catalytically active but sulfur tolerant platinum-palladium alloy and an oxide matrix. The invention resides, inter alia, in the surprising discovery that an alloy of platinum-palladium where the mole ratio is between about 2.5:1 and about 1:2.5 retains the sulfur tolerance of the platinum catalyst with an activity which is greater than either platinum or the generally more active palladium by themselves and thus avoiding the higher reaction temperatures in the hydrotreating process which introduces the undesirable cracking reactions. This catalyst also enables lube hydrotreating processing using feedstocks having initial higher sulfur concentrations on the order of up to about 200 ppm.

The catalysts are useful in, inter alia, the following processes:

a. Dewaxing the entire effluent implies either having the hydrotreating and dewaxing catalyst layers in a single reactor, or sequential layers in separate reactors with no treating of the fluids between.

b. Dewaxing all of the hydrotreated oil implies either (a) above or separating the gas, probably to purify it, before sending the liquid, purified gas and additional fresh (i.e., make-up) $H_2$ to the dewaxer.

c. Dewaxing a portion of the hydrotreated oil implies either (b) above or using the hydrotreater as a second stage hydrocracker, with sufficient conversion in the 2nd stage that the liquid product is fractionated to remove cracked products and the gases purified to remove excess hydrogen sulfide, ammonia, and possibly light hydrocarbon gases. The fraction of the hydrotreated product boiling in the desired lube range is then combined with purified hydrogen and cat dewaxed.

The embodiments wherein the processes are carried out in a single reactor with at least one hydrotreating and at least one dewaxing layer are particularly preferred.

DETAILED DESCRIPTION OF THE INVENTION

The present process is directed to hydrotreating reactions for preparing lubricating oils. Such hydrotreating reactions include removal of sulfur and nitrogen from petroleum streams and saturating the aromatics, olefins and other unsaturated molecules in these streams. While cracking of the components in the petroleum stream to lower boiling components may occur to some extent, it is preferred that such cracking be limited to less than 10% conversion, measured as the volume percent of the hydrotreated products having a boiling point below the boiling range of the hydrotreater feedstock.

The catalyst of the present invention, for hydrotreating refinery feedstocks, specifically those feedstocks being processed in the preparation of lubricating oils, includes a platinum-palladium alloy and an oxide matrix, wherein molar ratio of platinum to palladium in the alloy is between about 2.5:1 and about 1:2.5, preferably between about 2:1 and about 1:1 and most preferably the platinum to palladium ratio is 1:1.5. The particularly preferred catalyst exhibits the activity of the palladium based catalyst while maintaining the sulfur tolerance of the normally less reactive platinum based catalyst, thus avoiding the need of higher reaction temperatures which introduce undesirable rates of cracking reactions and produces products of low stability. This alloy material is a new catalyst species and different from a mixture of platinum and palladium metals on the catalyst acid support. The catalyst is preferably fabricated in accordance with the teachings of U.S. Pat. No. 5,393,408, the specification of which is completely incorporated herein by reference for all purposes.

In a preferred embodiment, the present catalyst is a macroporous hydrogenation catalyst having a total pore volume greater than about 0.45 cm$^3$/g, preferably greater than about 0.55 cm$^3$/g, with at least about 1%, and preferably at least about 3%, of the total pore volume being in macropores of diameter of greater than about 1000 angstroms, with the minimum amount of macropore volume preferably being greater than 0.07 cm$^3$/g. As used herein, the term "macroporous" refers to a catalyst having a relatively large amount of pore volume, i.e., at least 1%, in pores of diameter greater than about 1000 Angstroms, with a minimum macropore volume preferably being greater than 0.07 cm$^3$/g.

Catalyst Support

The oxide matrix material, which serves as the catalyst support, is selected from the oxides generally used in the art for preparing catalysts, including silica, alumina, magnesia, zirconia, titania. Clays may also be used. The preferred catalysts employed in the present invention contain a catalyst support that is generally prepared from silica-alumina base materials. The distribution of silica and alumina in the support may be either homogeneous or heterogeneous, but is preferably heterogeneous. A homogeneous distribution is ordinarily obtained when the silica-alumina ratio is uniform throughout the support, resulting for example from conventional coprecipitation or cogelation techniques. These homogeneous supports, wherein the necessary silica content is uniformly distributed, are difficult to prepare in the large-pore forms required herein. Pure alumina, on the other hand, can readily be prepared in these forms, preferably using acid or base peptization methods. A preferred form of the support consists of an alumina gel in which is dispersed the silica-alumina base material, which form is referred to herein as the "heterogeneous" support. The alumina gel is also referred to herein as the "oxide binder." The support may also contain refractory materials other than alumina or silica, such as for example other inorganic oxides or clay particles, provided that such material does not adversely affect the hydrogenation activity of the final catalyst. Other inorganic oxides that may be present in the support may include, but are not necessarily limited to, titania, magnesia and zirconia or combinations thereof Generally, silica-alumina will make up at least 90 weight percent of the entire support, and most preferably the support will be substantially all silica-alumina.

As stated above, the support is preferably prepared by mixing the base material with a peptized oxide binder, such as alumina, which has been treated with an acid, generally a strong acid such as nitric, acetic, or hydrochloric acids. Generally, the weight ratio of base material to oxide binder is in the range from 95/5 to 30/70 and preferably 65 base material/35 binder. Pore size is in part controlled in supports prepared as described herein by the length of time that the oxide binder is exposed to the acid during the peptizing step, and by the amount of acid used. To prepare the particulate refractory inorganic support for the catalyst, the base material is mixed with an oxide binder which has been treated with acid, preferably with less than about 3 weight percent of 100% pure acid (based on the weight of total calcined solids). A 4–12% acid is used to make a mesoporous catalyst. This catalyst will be suitable for lube and 2nd stage hydrotreating, though the macroporous catalyst is preferred, particularly for lubes feedstocks. The proportion of acid will vary depending on the type of acid, the reactivity of the raw material powders, the type of mixng equipment, and the mixing time, temperature, etc. The support used in the practice of the present invention is a particulate support. The exact size and shape of the catalyst support particles will vary depending on the particular method that will be used to hydrogenate the lubricating oil base stock. Most commonly, the support is formed into pellets of an appropriate size, normally at least 1/32 inch in diameter. As used herein, the term "pellets" is intended to include extrudates, prills, beads, tablets or any other suitable granular form. Pellets are preferred for use in hydrogenation processes employing packed beds and moving beds. However, for other processes, such as for use in a fluidized bed, it may be desirable for the support to be in a finely divided form such as a powder. When the support is to be extruded in the preparation of the catalyst materials, mixing the base material with the peptized oxide binder enhances the extrusion process and improves the strength of the completed catalyst pellets. The extrudate is usually dried and calcined in an oven to produce the support. After calcining, the support is ready for the addition of the hydrogenation component of the catalyst.

Pore size distribution for the catalysts employed in the present invention is determined using mercury intrusion porosimetry as described, for example, in ASTM D4284, "Pore Volume Distribution of Catalysts by Mercury Intrusion Porosimetry." According to this procedure, a catalyst is heated at 450° C. in a vacuum for 30 minutes to remove water vapor and other volatiles. A weighed portion of sample (0.3–0.5 g, depending on the total pore volume estimate) is placed in a volume-calibrated sample tube. The tube is filled with mercury and inserted into the pressurization chamber of a Quantachrome Auto-Scan Porosimeter. The pressure in the chamber is increased from 0 to 60,000 psig. As the pressure increases, the volume of mercury in the sample tube appears to decrease as the mercury intrudes into the pores of the sample. Apparent mercury volume is obtained as a function of the applied pressure. Apparent mercury volume and applied pressure are then related to pore volume (V) and pore diameter (D), respectively. Results are reported as plots of pore volume (in cm$^3$) and cumulative pore volume (cm$^3$) as a function of pore diameter (in angstroms). Analysis of the data gives the percent macropore volume according to the formula: Percent Macropore Volume=(macropore volume/total pore volume)×100.

Preferably, the base material of the catalyst of the present invention comprises at least 30 weight percent silica, and more preferably comprises at least 40 weight percent silica, and most preferably contains in the range of about 40 weight percent silica to about 99 weight percent silica.

Base materials suitable for preparing the catalysts used in the process of this invention are commercially available, for example, from Condea Chemie, GmbH of Hamburg, Germany, and base materials from Condea Chemie designated as "Siral 40" have been found to be particularly suitable to prepare catalysts employed in the present invention. Alternatively, the silica-alumina base materials are prepared using known coprecipitation, cogelation, and/or comull procedures. Crystalline silica-alumina materials such as zeolites may also be included as part of the support of the hydrogenation catalysts to increase catalyst acidity.

Hydrogenation Component

The amount of platinum-palladium alloy placed on the support must be sufficient to act as an effective catalyst in the hydrogenation of the lubricating oil base stock. Generally, the amount of alloy on the support used to catalyze a hydrogenation process within the scope of the present invention will be within the range of from about 0.01 weight percent to about 5 weight percent, preferably the range is from about 0.1 weight percent to about 1 weight percent. Generally, adding greater than about 1 weight percent of the alloy does not significantly improve on the activity of the catalyst and is therefore economically disadvantageous. However, amounts in excess of 1 weight percent are usually not harmful to the performance of the catalyst.

A number of methods are known in the art to deposit platinum and palladium metal or their compounds onto the support, such as, for example, by ion exchange, impregnation, coprecipitation, etc. It has been found that depositing platinum and palladium on the supports used in the catalyst of the present invention is particularly advantageous when using a contacting solution containing active compounds of both platinum and palladium under a controlled pH.

The contacting solution preferably will be buffered to maintain a pH within the range of from about 9 to about 10. Values outside of this pH range may be used to deposit platinum and palladium jointly on the support, but the final distribution of the alloy on the support may not be as favorable as those obtained within this pH range.

When depositing platinum and palladium by impregnation, the metals are usually added to the impregnating solution as a metal salt, generally as an organic amine complex salt of a mineral acid. Ammonium salts have been found to be particularly useful in preparing the impregnating solution. Representative of the ammonium salts that may be used are nitrates, carbonates, bicarbonates and lower carboxylic acid salts such as acetates and formates. In the case of palladium, an ammonium nitrate salt or an ammonium chloride salt have been found to give satisfactory results. However, other salts of the metals are also operable and could be used to impregnate the support. In such case, it may be useful to determine the optimal pH to use during impregnation for the particular salt selected in order to obtain the best distribution of metals on the support. It has been found that excellent distribution of palladium will be obtained using the present support if an impregnating solution containing tetraamine palladium nitrate is buffered to a pH of from between about 9.6 and about 10.

Following impregnation, the impregnated support should be allowed to stand before drying for a period of time sufficient for it to attain equilibration with the impregnating solution. For an extrudate, this period usually is at least 2 hours, and periods of up to 24 hours are not detrimental to the finished catalyst. A suitable time for a given support may be readily determined by one skilled in the art having regard to this disclosure by, for example, drying at various times after impregnation and measuring the metal distribution.

Following impregnation and standing, the catalyst is again dried and/or calcined. The prepared catalyst may be reduced with hydrogen as is conventional in the art and placed into service.

Feed Pretreating

A lubricating oil base stock is a petroleum stream that is useful for the production of lubricating oils. Lubricating oil base stocks generally boil in the range from 500° F. to 1300° F., and have a kinematic viscosity (measured at 100° C.) greater than about 3 cSt. A lubricating oil base stock will generally have been pretreated prior to hydrotreating. Pretreatment processes may include, for example, one or more of hydrocracking, solvent extraction, and/or dewaxing to lower the pour point. Following hydrotreating, the lubricating oil base stocks may be further treated to meet specific quality specifications, such as by dewaxing. Dewaxing may be carried out by conventional means known in the art such as, for example, by solvent dewaxing or by catalytic dewaxing. Catalytic dewaxing processes which may be useful in the present process are well known in the art. Dewaxing processes using a catalyst containing SAPO-11 are disclosed, for example, in U.S. Pat. Nos. 4,859,311; 4,921,594; 5,149,421; and 5,413,695. Dewaxing processes using a catalyst containing SSZ-32 are disclosed, for example, in U.S. Pat. Nos. 5,300,210; 5,397,454; and 5,376,260.

As stated above, the lubricating oil base stock may have been treated by hydrocracking prior to the hydrogenation process of this invention. The hydrocarbonaceous feeds that are suitable for use in preparing lubricating oil base stock by hydrocracking usually contain aromatic compounds as well as normal and branched paraffins of very long chain lengths. Preferred feedstocks are vacuum gas oils and deasphalted residual oils. Reduced topped crude oils, shale oils, liquefied coal, coke distillates, flask or thermally cracked oils, atmospheric residua, and other heavy oils can also be used as a source of feedstock. Hydrocracking processes typically include reaction temperatures in the range of 250° C. to 500° C., pressures in the range of 30 to 205 bar or more, a hydrogen recycle rate of 100 to 1100 SCM/KL, and an LHSV (v/v hr) of 0.1 to 10. Hydrocracking catalysts, which are well known to the art of hydroprocessing technology, will typically contain one or more metals, or compounds thereof, selected from Group VIB and Group VIII of the Periodic Table. Hydrocracking catalysts also typically include a support material of a refractory inorganic oxide such as silica-alumina, silica-alumina-zirconia, and silica-alumina-titania composites, acid treated clays and combinations thereof, and optionally may also include crystalline aluminosilicate zeolitic molecular sieves (such as Zeolite A, faujasite, Zeolite X, and Zeolite Y).

Lubricating oil base stocks that are suitable for use in the present invention also may be recovered from a solvent extraction process. In solvent extraction, a distillate fraction, generally a vacuum gas oil, which optionally has been desulfurized, is contacted with a solvent, such as N-methyl pyrrolidone or furfural, in a solvent extraction zone, preferably employing a countercurrent extraction unit. The aromatics-lean raffinate is stripped of solvent, optionally dewaxed, and subsequently hydrogenated to improve product stability and color. The recovered solvent is usually recycled.

Hydrotreating Conditions

The process of the present invention is directed to hydrotreating of lubricating oil base stocks, and in particular to those lubricating oil base stocks which have been hydrocracked. The hydrogenation reaction takes place in the presence of hydrogen, preferably at hydrogen pressures in the range of between about 500 psia and 4000 psia, more preferably in the range of about 900 psia to about 3000 psia.

The feed rate to the hydrogenation catalyst system is in the range of from about 0.2 to about 1.5 LHSV, preferably in the range of about 0.2 to about 1.0 LHSV. The hydrogen supply (makeup and recycle) is in the range of from about 500 to about 20,000 standard cubic feet per barrel of lubricating oil base stock, preferably in the range of from about 2000 to about 10,000 standard cubic feet per barrel.

As disclosed above, the lubricating oil base stock may be hydrotreated prior or after dewaxing, or both. The hydrotreating reaction zone may be in separate reactors, or may be layered with the dewaxing catalyst in the same reactor. For hydrotreating the dewaxer feedstock, the reaction temperature in generally in the range of 600° F. to 800° F., and preferably in the range of 625° F. to 750° F. For hydrotreating and stabilizing the dewaxed lube oil base stock, the reaction temperature is preferably in the range of 400° F. to 625° F.

EXAMPLES

The following examples further clarify preferred embodiments and aspects of the invention and are not intended to be limiting on the scope of the invention.

Example 1
PREPARATION OF CATALYSTS

Catalyst/examples A through G are discussed below. With the exception of Catalyst G, all of the Catalysts were prepared using the same macroporous silica-alumina catalyst support. The preparation of this support material is described in U.S. Pat. No. 5,393,408, the specification of which is completely incorporated herein by reference for all purposes. This support had the following properties:

| Physical Property | Catalyst Supports A–F |
|---|---|
| Particle Density, g/cm$^3$ | 0.887 |
| BET Surface Area, m$^2$/g | 442 |
| Total Pore Volume, cm$^3$/g | 0.694 |
| Macro Pore Volume, cm$^3$/g | 0.130 |
| SiO$_2$/Al$_2$O$_3$ Mole Ratio | 0.86 |

Catalyst A

A hydrogenation catalyst with platinum was prepared using 400 grams (volatiles-free basis) of macroporous catalyst support which has been equilibrated overnight at ambient conditions. A platinum solution was prepared by dissolving 3.97 grams of tetraamine platinum nitrate (Pt(NH$_3$)$_4$(NO$_3$)$_2$ in deionized water which contained sufficient NH$_4$OH to maintain a pH in the range of 9.3–10.0.

The equilibrated mesoporous catalyst support was impregnated with the platinum solution by spray pore fill to a nominal loading of 0.5 weight percent Pt on the finished catalyst. Enough platinum solution was sprayed onto the support over a period of 10 to 15 minutes to fill the pore volume of the support. The support was then allowed to soak for 4 hours, with additional shaking each 30 minutes. During the soak, water was added as required to the support to keep it damp.

After soaking overnight, the impregnated support was dried for 2 hours at 140° C. in a forced-convection oven under flowing air, followed by 2 hours at 100° C. After drying, the catalyst was loaded into two muffle pots at a depth of 1¼ inches and shock calcined at 850° F. in 4 ft$^3$/hr dry air in a furnace for 45 minutes.

Catalyst B*

A hydrogenation catalyst with platinum and palladium was prepared using 400 grams (volatiles-free basis) of macroporous catalyst support which has been equilibrated overnight at ambient conditions. A platinum and palladium solution was prepared by dissolving 1.59 grams of tetraamine platinum nitrate (Pt(NH$_3$)$_4$(NO$_3$)$_2$ and 0.64 grams of tetraamine palladium nitrate (Pd(NH$_3$)$_4$(NO$_3$)$_2$ in deionized water which contained sufficient NH$_4$OH to maintain a pH in the range of 9.3–10.0.

The equilibrated mesoporous catalyst support was impregnated with the platinum and palladium solution by spray pore fill to a nominal loading of 0.2 weight percent Pt and 0.16 weight percent Pd on the finished catalyst. Enough platinum and palladium solution was sprayed onto the support over a period of 10 to 15 minutes to fill the pore volume of the support. The support was then allowed to soak for 4 hours, with additional shaking each 30 minutes. During the soak, water was added as required to the support to keep it damp. After soaking overnight, the impregnated support was dried and calcined using the same procedure as described earlier for Catalyst A.

Catalyst C

A hydrogenation catalyst containing 0.5 wt % Pd was prepared on the macroporous catalyst support described above using a solution of tetraamine palladium nitrate using methods similar to those described for Catalysts A and B.

Catalyst D*

A hydrogenation catalyst containing 0.1 wt % Pt and 0.4 wt % Pd was prepared on the macroporous catalyst support described above using a solution of platinum acetylacetonate and palladium acetylacetonate in acetone. The platinum and palladium solution was prepared by dissolving 0.81 grams of platinum acetylacetonate (Pt(AcAc)$_2$) $_{and}$ 4.58 grams of palladium acetylacetonate (Pd(AcAc)$_2$) in 1090 mls of acetone.

The equilibrated mesoporous catalyst support was impregnated with the platinum and palladium solution by spray pore fill to a nominal loading of 0.1 weight percent Pt and 0.4 weight percent Pd on the finished catalyst. Enough platinum and palladium solution was sprayed onto the support over a period of 2 hour 15 minutes to fill the pore volume of the support. Excess acetone solvent was removed from the catalyst during the impregnation by placing the flask under house vacuum (~100 torr). After all of the platinum and palladium solution was added, the support was then allowed to soak for 4 hours, with additional shaking each 30 minutes. During the soak, acetone was added as required to the support to keep it damp. After soaking overnight, the impregnated support was dried under vacuum and calcined using the same procedure as described earlier for Catalyst A.

Catalyst E

A hydrogenation catalyst containing 0.5 wt % Ru was prepared on the macroporous catalyst support described above using a solution of ruthenium acetylacetonate in acetone. The ruthenium solution was prepared by dissolving 7.88 grams of ruthenium acetylacetonate (Ru(AcAc)$_2$) $_{in}$ 308 mls of acetone.

The equilibrated mesoporous catalyst support was impregnated with the ruthenium solution by spray pore fill to a nominal loading of 0.5 weight percent Ru on the finished catalyst. Enough ruthenium solution was sprayed onto the support over a period of 15 minutes to fill the pore volume of the support. After all of the ruthenium solution was added, the support was then allowed to soak for 4 hours, with additional shaking each 30 minutes. During the soak, acetone was added as required to the support to keep it damp. After soaking overnight, the impregnated support was dried under vacuum and calcined using the same procedure as described earlier for Catalyst A.

Catalyst F

A hydrogenation catalyst containing 0.1 wt % Pt and 0.4 wt % Ru was prepared on the macroporous catalyst support described above using a solution of platinum acetylacetonate and ruthenium acetylacetonate in acetone. The platinum and palladium solution was prepared by dissolving 0.81 grams of platinum acetylacetonate $(Pt(AcAc)_2)$ and 6.3 grams of ruthenium acetylacetonate $(Ru(AcAc)_2)$ in 250 mls of acetone.

The equilibrated mesoporous catalyst support was impregnated with the platinum and ruthenium solution by spray pore fill to a nominal loading of 0.1 weight percent Pt and 0.4 weight percent Ru on the finished catalyst. Enough platinum and ruthenium solution was sprayed onto the support over a period of 15 minutes to fill the pore volume of the support. After all of the platinum and ruthenium solution was added, the support was then allowed to soak for 4 hours, with additional shaking each 30 minutes. During the soak, acetone was added as required to the support to keep it damp. After soaking overnight, the impregnated support was dried under vacuum and calcined using the same procedure as described earlier for Catalyst A.

Catalyst G

Catalyst G was a commercial Mickel-Tungsten hydrotreating catalyst with the following properties:

| Physical Property | Catalyst G |
| --- | --- |
| Particle Density, g/cm$^3$ | 1.42 |
| BET Surface Area, m$^2$/g | 330 |
| Total Pore Volume, cm/g | 0.316 |
| Macro Pore Volume, cm$^3$/g | 0.039 |
| Aluminum, wt % | 23.3 |
| Silicon, wt % | 10.5 |
| Nickel, wt % | 5.4 |
| Tungsten, wt % | 20.3 |

Example 2

A series of experiments in a trickle bed miniature pilot plant were carried out to demonstrate the advantages of the present invention. 3.5 grams of Catalyst A crushed to 24–60 Tyler mesh size into a ⅜ inch was loaded into stainless steel reactor to give a total volume of approximately 6.7 cc's. The remaining dead volume of the reactor was filled with 24–42 mesh inert allundum. The catalyst was preconditioned by passing hydrogen in situ at 150 PSIG for 4 hours at a rate of 238 ml/min while the catalyst temperature was raised from 75° F. to 400° F. at a rate of 100° F./hr. Following this period of reduction and drying, the reactor pressure was increased to 2100 psig over the next 0.5 hours before we introduced the hydrocarbon feed.

The feed that was used to test the catalyst was a 850–1100° F. boiling range, hydrocracked and ISODE-WAXED heavy neutral oil, spiked with tertiary nonyl polysulfide (TNPS~37% S) to give a total sulfur content of 150 ppm. Table 1 below gives properties for Feed A used in the examples.

TABLE I

| Hydrocarbon Feed Properties Used in Examples 2–8 | |
| --- | --- |
| ° API Gravity | 30.4 |
| Pour Point, ° C. | −9 |
| Viscosity (@ 40° C., cSt | 93.35 |
| Viscosity (@ 100° C., cSt | 10.83 |
| Viscosity Index | 100 |
| Sulfur, ppm | 146 |
| Nitrogen, ppm | 0.32 |
| D2887 Dist., Wt %, ° F. | |
| St | 662 |
| 5 | 767 |
| 10 | 811 |
| 30 | 891 |
| 50 | 934 |
| 70 | 974 |
| 90 | 1030 |
| 95 | 1066 |
| 99.5 | 1150 |
| UV Abs, Abs*cc/g*mm | |
| 272 nm | 35.53 |
| 310 nm | 11.63 |
| 348 nm | 5.29 |
| 384 nm | 0.73 |

Feed A was first introduced into the reactor at 16 cc/hr at 400° F. and then raised the temperature of the catalyst to 450° F. at a rate of 25° F./hr. The total amount of sulfur in the feed was sufficient to completely sulfide the metal in this catalyst after approximately 5 hours.

Once the reactor temperature reached 450° F., the catalyst was allowed to remain at this condition for a period of 72 hours, at which time a sample of the product oil (Sample 1) was retained for UV analysis. The catalyst was then raised to 500° F. over a period of one hour, and allowed to remain at this condition for a period of 24 hours. The catalyst was then raised to 550° F. over a period of one hour, and allowed to remain at this condition for a period of 24 hours. Our purpose in subjecting the catalyst to this series of 24 hour high temperature treatments was to rapidly deactivate and condition the catalyst so that its activity would more closely resemble a catalyst with several hundred hours onstream. The catalyst in the reactor was then cooled back down to 450° F. and allowed to stabilize for a period of 48 hours. After this time, a second sample of oil was retained for analysis.

Table II summarizes the UV absorbance characteristics of Samples 1 and 2. Since the most abundant type of aromatic in this feed was identified as a substituted allyl-tetralin derivative with a principle UV absorbance at 272 nm's, a value could be defined for aromatic to saturate conversion based on the following equation:

% Conversion=(272 nm $Abs_{feed}$−272 nm $Abs_{product}$)*100/272 nm $Abs_{feed}$ Table II displays the results of our metric for aromatic conversion.

TABLE II

| Hours on Stream | 69 | 143 |
|---|---|---|
| Reactor Temp., ° F. | 450 | 450 |
| Wt. % Lube Yield | 100 | 100 |
| LHSV/hr (overall) | 2.4 | 2.4 |
| UV Abs @ 272 nm abs*cc/g*mm | 13.56 | 14.41 |
| % Arom Conversion | 45.61 | 43.82 |

Example 3*

In this example, Catalyst B was run in a microreactor test using the same feed and startup conditions as used in Example 2. The results for this test are summarized in Table III.

TABLE III

| Hours on Stream | 71.7 | 157 |
|---|---|---|
| Reactor Temp., ° F. | 450 | 450 |
| Wt. % Lube Yield | 100 | 100 |
| LHSV/hr (overall) | 2.4 | 2.4 |
| UV Abs @ 272 nm abs*cc/g*mm | 3.65 | 10.20 |
| % Arom Conversion | 86.14 | 60.21 |

Example 4

In this example, Catalyst C was run in a microreactor test using the same feed and startup conditions as used in Example 2. The results for this test are summarized in Table IV.

TABLE IV

| Hours on Stream | 70 | 155.8 |
|---|---|---|
| Reactor Temp., ° F. | 450 | 450 |
| Wt. % Lube Yield | 100 | 100 |
| LHSV/hr (overall) | 2.4 | 2.4 |
| UV Abs @ 272 nm abs*cc/g*mm | 7.40 | 20.97 |
| % Arom Conversion | 68.95 | 23.91 |

Example 5*

In this example, Catalyst D was run in a microreactor test using the same feed and startup conditions as used in Example 2. The results for this test are summarized in Table V.

TABLE V

| Hours on Stream | 70 | 155 |
|---|---|---|
| Reactor Temp., ° F. | 450 | 450 |
| Wt. % Lube Yield | 100 | 100 |
| LHSV/hr (overall) | 2.4 | 2.4 |
| UV Abs @ 272 nm abs*cc/g*mm | 5.76 | 20.48 |
| % Arom Conversion | 78.04 | 26.99 |

Example 6

In this example, Catalyst E was run in a microreactor test using the same feed and startup conditions as used in Example 2. The results for this test are summarized in Table VI.

TABLE VI

| Hours on Stream | 66 | 157 |
|---|---|---|
| Reactor Temp., ° F. | 450 | 450 |
| Wt. % Lube Yield | 100 | 100 |
| LHSV/hr (overall) | 2.4 | 2.4 |
| UV Abs @ 272 nm abs*cc/g*mm | 32.52 | 34.19 |
| % Arom Conversion | 1.71 | −0.45 |

Example 7

In this example, Catalyst F was run in a microreactor test using the same feed and startup conditions as used in Example 2. The results for this test are summarized in Table VII.

TABLB VII

| Hours on Stream | 69 | 156 |
|---|---|---|
| Reactor Temp., ° F. | 450 | 450 |
| Wt. % Lube Yield | 100 | 100 |
| LHSV/hr (overall) | 2.4 | 2.4 |
| UV Abs @ 272 nm abs*cc/g*mm | 29.51 | 30.44 |
| % Arom Conversion | 1.67 | 0.61 |

Example 8

In this example, Catalyst G was run in a microreactor test using the same feed and startup conditions as used in Example 2. The results for this test are summarized in Table VIII.

TABLE VIII

| Hours on Stream | 66 | 152 |
|---|---|---|
| Reactor Temp., ° F. | 450 | 450 |
| Wt. % Lube Yield | 100 | 100 |
| LHSV/hr (overall) | 2.4 | 2.4 |
| UV Abs @ 272 nm abs*cc/g*mm | 20.77 | 21.97 |
| % Arom Conversion | 24.03 | 22.10 |

These examples of preferred embodiments clearly illustrate the superiority of the Pt/Pd alloy catalyst in processing sulfur containing feeds.

What is claimed is:

1. A hydroconversion catalyst exhibiting improved sulfur tolerance comprising a platinum-palladium alloy and an oxide matrix, wherein the molar ratio of platinum to palladium in the alloy is between about 2:1 and about 1:1 and wherein the catalyst comprises between about 0.1 weight percent and about 1.0 weight percent of the platinum-palladium alloy, the oxide matrix comprises silica, alumina, or combinations thereof, the oxide matrix has a weight ratio of silica to alumina in the range from about 1:10 to 10:1 and having a total pore volume greater than about 0.45 cm$^3$/g with at least about 1% of the total pore volume being macropores of diameter greater than about 1000 angstroms.

2. The catalyst according to claim 1 wherein the oxide matrix comprises silica-alumina having a weight ratio of silica to alumina in the range from about 25:75 to about 75:25.

3. The catalyst according to claim 1 having a total pore volume greater than about 0.55 cm$^3$/g.

4. The catalyst according to claim 3 with at least about 3% of the total pore volume being in macropores of diameter greater than about 1000 Angstroms.

5. The catalyst according to claim 1 wherein the oxide matrix further comprises an aluminosilicate zeolite selected from zeolite Y, faujasite and ultrastable Y.

6. The catalyst according to claim 1 with at least about 3% of the total pore volume being in macropores of diameter greater than about 1000 Angstroms.

7. A process for preparing the catalyst of claim 1 comprising:
   a) combining silica-alumina particulates and an alumina binder to form an oxide matrix;
   b) contacting the oxide matrix with a catalytic amount of a solution comprising active sources of platinum and palladium at conditions sufficient to produce catalytic particulates having both platinum and palladium supported thereon; and
   c) treating the oxide matrix containing the platinum and palladium at conditions suitable to form an alloy of platinum and palladium on the oxide matrix.

8. The process according to claim 7 wherein the catalyst comprises a platinum-palladium alloy and an oxide matrix wherein the molar ratio of platinum to palladium in the alloy is between2.5:1 to 1:2.5.

9. The process according to claim 8 wherein the platinum to palladium in the alloy is about 1:1.5.

10. A hydroconversion catalyst exhibiting improved sulfur tolerance comprising a platinum-palladium alloy and an oxide matrix, wherein the molar ratio of platinum to palladium in the alloy is about 1:1.5 and wherein the catalyst comprises between about 0.1 weight percent and about 1.0 weight percent of the platinum-palladium alloy, the oxide matrix comprises silica, alumina, or combinations thereof, the oxide matrix having a weight ratio of silica to alumina in a range of from about 1:10 to about 10:1 and having a total pore volume greater than about 0.45 $cm^3$/g with at least about 1% of the total pore volume being macropores of diameter greater than about 1000 angstroms.

11. A hydroconversion catalyst exhibiting improved sulfur tolerance comprising a platinum-palladium alloy and an oxide matrix containing silica and alumina, wherein:
   a) the molar ratio of platinum to palladium in the alloy is between about 2.5:1 and about 1:2.5;
   b) the oxide matrix contains at least 30 weight percent silica; and
   c) the catalyst has a total pore volume greater than about 0.45 $cm^3$/gm, with at least 1% of the total pore volume being in macropores of diameter greater than about 1000 Angstroms.

12. The catalyst according to claim 11 wherein the molar ratio of platinum to palladium in the alloy is 1:1.5.

13. The catalyst according to claim 11 wherein the oxide matrix contains at least 40 weight percent silica.

14. The catalyst according to claim 11 wherein at least 3% of the total pore volume of the catalyst is in macropores of diameter greater than about 1000 Angstroms.

* * * * *